United States Patent
Bent et al.

(10) Patent No.: US 9,501,229 B1
(45) Date of Patent: Nov. 22, 2016

(54) MULTI-TIERED COARRAY PROGRAMMING

(71) Applicant: EMC Corporation, Hopkinton, MA (US)

(72) Inventors: John M. Bent, Los Alamos, NM (US); Sorin Faibish, Newton, MA (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 22 days.

(21) Appl. No.: 14/580,544

(22) Filed: Dec. 23, 2014

(51) Int. Cl.
*G06F 12/00* (2006.01)
*G06F 3/06* (2006.01)

(52) U.S. Cl.
CPC ........... *G06F 3/0611* (2013.01); *G06F 3/0635* (2013.01); *G06F 3/0655* (2013.01); *G06F 3/0688* (2013.01); *G06F 3/0689* (2013.01)

(58) Field of Classification Search
CPC .. G06F 3/0611; G06F 3/0689; G06F 3/0688; G06F 3/0655
See application file for complete search history.

(56) References Cited

U.S. PATENT DOCUMENTS

| | | | | |
|---|---|---|---|---|
| 2009/0292734 | A1* | 11/2009 | Miloushev | G06F 11/1076 |
| 2013/0111107 | A1* | 5/2013 | Chang | G06F 12/10 711/103 |

OTHER PUBLICATIONS

Hedges et al., "Parallel File System Testing for the Lunatic Fringe: the care and feeding of restless I/O Poer Users", Proceedings of the 22nd IEEE 13th NASA Goddard Conference on Mass Storage Systems and Technologies (2005).
Ananthanarayanan et al., "Cloud analytics: Do we really need to reinvent the storage stack?", https://www.usenix.org/legacy/event/hotcloud09/tech/full_papers/ananthanarayanan.pdf, downloaded Dec. 18, 2014.
Tantisiriroj et al., "Crossing the Chasm: Sneaking a Parallel File System into Hadoop",Carnegie Mellon Parallel Data Laboratory, (Nov. 2008).
Jessica A. Popp, "Fast Forward Storage and IO Program Documents", HPDD Community Space / HPDD Wiki Front Page, https://wiki.hpdd.intel.com/display/PUB/Fast+Forward+Storage+and+IO+Program+Documents, downloaded Dec. 18, 2014.
"OpenMP", http://en.m.wikipedia.org/wiki/OpenMP, downloaded Dec. 11, 2014.

* cited by examiner

*Primary Examiner* — Gurtej Bansal
(74) *Attorney, Agent, or Firm* — Ryan, Mason & Lewis, LLP

(57) ABSTRACT

Techniques are provided for multi-tiered coarray programming. An exemplary coarray programming method comprises obtaining an index address identifying a memory element in a memory array in a multi-tiered storage environment, wherein the index address comprises an identifier of a storage tier within the multi-tiered storage environment where the memory element is stored; and converting the index address to one or more of a path name, an object name and a key value based on the identified storage tier to access the memory element. Exemplary aspects of the invention extend a coarray programming model to employ one or more of a file interface and an object interface for remote storage tiers.

20 Claims, 9 Drawing Sheets

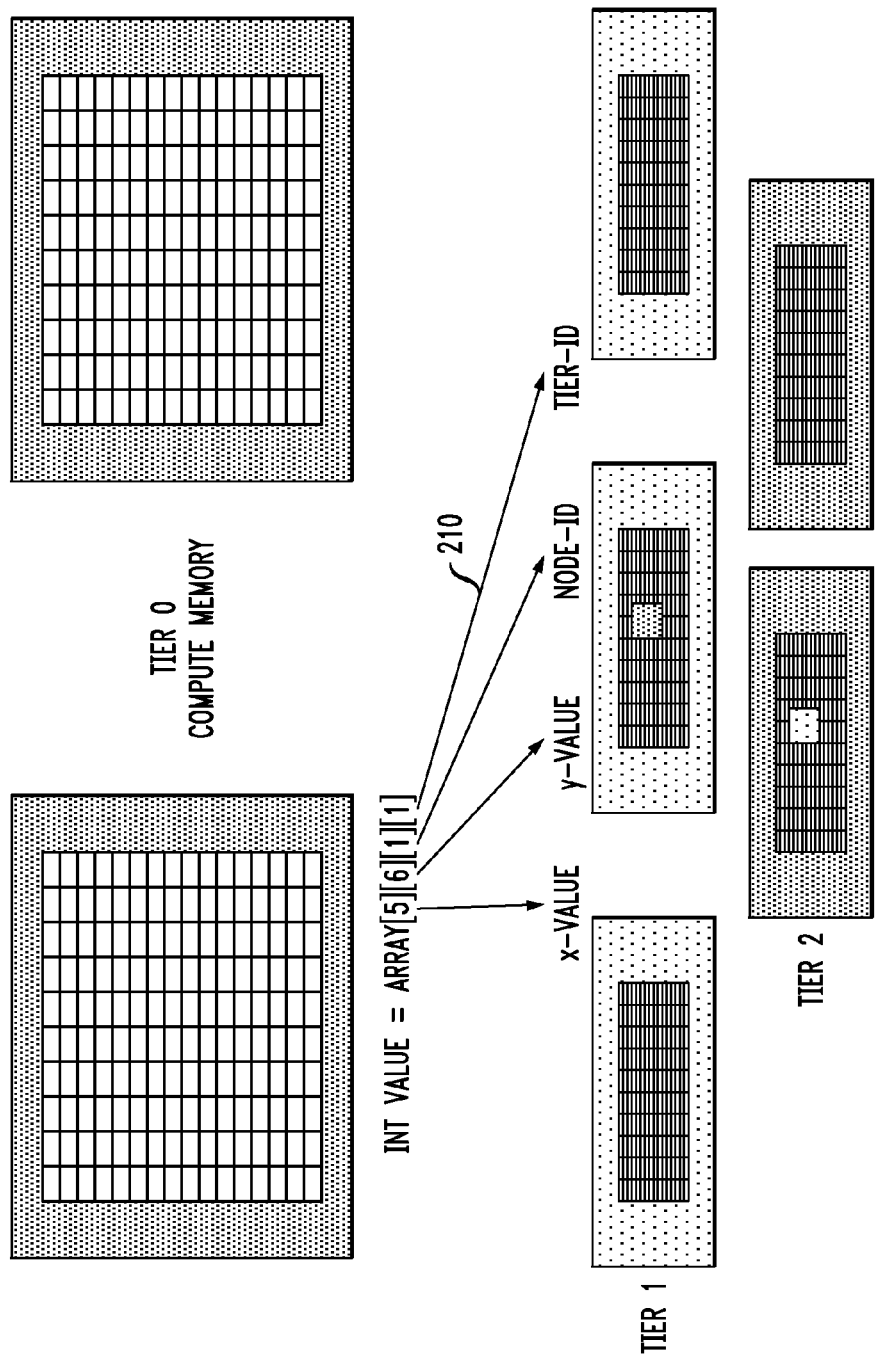

FIG. 3

```
// existing CAF compilers read programmer source code and turn array element
accesses to remote memory into network communications
// present invention extends existing CAF compilers to turn array element accesses
to storage tiers into storage communications // the routines within the compiler that identify these accesses are extensions of existing
compiler routines and make calls to new abstract storage layer virtual class storage {
    // notice the index notation in case there are multiple nodes at this layer
    int put ( void *buffer, len_t len, int index, address dest );
    int get ( void *buffer, len_t len, int index, address src );
    int init() = NULL; // in case a layer doesn't provide
};
```

```
// a few different storage classes can be implemented
// CLASS 1. dssd:
//  * fast low latency access to PCIE connected flash (one dssd node only for time being)
// CLASS 2. remote local disk:
//  * each CN can have it's own local disk system
// CLASS 3. remote storage system:
//  * all CNs can be connected to a global storage system (disk-based. Either file or object).
// CLASS 4. kinetic. Not shown
//  * interface like DSSD. Could be used in place of ordinary disks in CLASS 2.
//  * just replace the POSIX IO calls with the kinetic KV api
// CLASS 5. database. MDHIM or ViPR
//  * if local DB, then use client-servers like in CLASS 2 but change POSIX to DB API
//  * if remote DB, then use CLASS 3 but replace POSIX to DB API
```

```
// CLASS 1: DSSD
// then various hardware devices will implement the put and get routines
class dssd extends storage {
  int put (void *buffer, len_t len, int index, address dest ) {
    if (index != 0) {
        // DSSD cannot currently be clustered
        // future optimizations can cluster them and provide network
        // substrates to connect them. This will require client / server
        // pairs to host each DSSD in the DSSD cluster
        return ENOSYS;
    }
    key = addr_to_key(dest);
    dssd_put(buffer,len,key);
    }
  int get (void *buffer, len_t len, int index, address dest ) { if (index != 0) {
        // DSSD cannot currently be clustered
        // future optimizations can cluster them and provide network
        // substrates to connect them. This will require client / server
        // pairs to host each DSSD in the DSSD cluster
        return ENOSYS;
    }
    key = addr_to_key(dest);
    dssd_get(buffer,len,key);
  }
  PRIVATE:
    key addr_to_key( address dest ) {
        // concatenate the multiple index values in the address into a key
    }
}
// a similar class could be made for kinetic
// class kinetic would be the same but use the kinetic equivalents
// of dssd_get and dssd_put
```

FIG. 6

```
// CLASS 2. remote local disk:
  // each compute node could have a local disk drive
  // set up communicators so that each CN can access each other's disk drives
class local extends storage {
  PUBLIC: int init( ) {
    // read a config file, get other initialization information
    // for each CN, set up the network communications
    // set my rank so each rank knows to which index it belongs
    // fork a server thread to listen for requests from siblings fork(&server);
}
int put (void *buffer, len_t len, int index, address dest ) {
  path = addr_to_file();
  if (index == my_rank) {
    return local_put(buffer,len,path);
  } else {
    send_request(PUT,index,buffer,len,path);
    recv_ack(index,buffer,len,path);
    }
  }
}
int get (void *buffer, len_t len, int index, address dest ) {
  path = addr_to_file(dest);
  if (index == my_rank) {
    return local_get(buffer,len,path);
  } else {
    send_request(GET,index,buffer,len,path);
    recv_data(index,buffer,len,path);
    }
}
```

```
// the private functions are basically the helper functions
PRIVATE:
void server() {
  // this is the thread where the server runs
  while(1) {
    select(message_port)
    (direction,buffer,len,addr) = read_request(message_port);
    switch(direction) {
      case PUT:
        local_put(buffer,len,addr);
        // send acknowledgement
        break;
      case GET:
        local_get(buffer,len,addr):
        // send the buffer back
        break;
    }
  }
}
```

FIG. 8

```
                                                          ┌800
path addr_to_file(address) {
    // concatenate the index fields into a path name
  }
  int send_request(index,buffer,len,dest) {
    // set up the client / server pairs in the init() function
    // package the request into a message and send it using
    // local client to the server at the appropriate index
  }
  int local_get(void *buffer, len_t len, path dest) {
    // since this is a file system, just use POSIX
    int fd = open(dest,"r");
    read(fd,buffer,len);
  }
  int local_put(void *buffer, len_t len, address dest) {
    int fd = open(dest,"w");
    write(fd,buffer,len);
  }
  int my_rank;
}
```

*FIG. 9*

```
// CLASS 3. remote storage system:
 // this is similar to CLASS 2 so it can inherit from it
 // CLASS 3 is simpler than CLASS 2 since it doesn't need its own
 // client/server pairs but just uses the existing file system client 135
 // like DSSD, there would probably only be one of these
 class remote extends local {
   int get (void *buffer, len_t len, int index, address dest ) {
     path = addr_to_file(dest);
     int fd = open(dest,"r");
     read(fd, buffer, len);
   }
   int put (void *buffer, len_t len, int index, address dest ) {
     path = addr_to_file(dest);
     int fd = open(dest,"w");
     write(fd,buffer,len);
   }
 }
```

MULTI-TIERED COARRAY PROGRAMMING

FIELD

The field relates generally to data storage, and more particularly, to data storage using coarray programming.

BACKGROUND

Many compute sites support a combination of enterprise and High Performance Computing (HPC) applications. HPC workloads tend to be comprised of a plurality of interdependent parallel processes that must run synchronously in time due to the large amount of inter-process communication. Typical HPC workloads execute on clusters of compute nodes interconnected by a low-latency network. Enterprise workloads, on the other hand, tend to be independent tasks that do not require a significant amount of inter-process communication.

Unfortunately, the compute infrastructure historically employed for an enterprise site does not closely resemble the compute infrastructure historically employed for HPC sites. Therefore, distinct compute sites have typically been employed for each workload type. It is anticipated, however, that HPC and enterprise computing systems will converge. For typical compute systems, there is significant pressure to support a variety of services using a shared converged infrastructure.

Coarrays are an extension of Fortran and allow a set of cooperative processes to share memory arrays. Each process (often referred to as an image) has its own private variables. Coarrays are variables that are visible on more than one image. Coarray Fortran employs a coarray parallel programming model that extends the array syntax of Fortran with indices to indicate the location of a data element across a set of cooperative processes.

In both HPC and enterprise environments, there is an emerging hardware architecture in which multi-tiered storage is employed. For example, the multi-tiered storage may comprise a "fast" storage tier and a "slow" storage tier, where "fast" and "slow" in this context are relative to one another. Thus, in order for HPC applications to be successfully deployed in a multi-tiered enterprise storage environment, a need exists for a coarray parallel programming model for multi-tiered enterprise storage architectures.

SUMMARY

Illustrative embodiments of the present invention provide techniques for multi-tiered coarray programming. In one embodiment, a coarray programming method comprises obtaining an index address identifying a memory element in a memory array in a multi-tiered storage environment, wherein the index address comprises an identifier of a storage tier within the multi-tiered storage environment where the memory element is stored; and converting the index address to one or more of a path name, an object name and a key value based on the identified storage tier to access the memory element. Exemplary aspects of the invention extend a coarray programming model to employ a file interface and/or an object interface for remote storage tiers.

The index address can be converted, for example, by converting an access of an array element to an access of a storage tier in the multi-tiered storage environment using storage communications, and/or by employing a software function to concatenate a plurality of index values within the index address into the one or more of the path name, the object name and the key value.

The multi-tiered coarray programming techniques of the illustrative embodiments overcome one or more of the problems associated with the conventional techniques described previously, and allow HPC applications to be deployed in a multi-tiered enterprise storage environment. These and other features and advantages of the present invention will become more readily apparent from the accompanying drawings and the following detailed description.

BRIEF DESCRIPTION OF THE DRAWINGS

FIG. 2 illustrates a multi-tiered coarray programming model incorporating aspects of the invention; and FIGS. 3 through 9, collectively, illustrate exemplary pseudo code that extends existing Message Passing Interface (MPI) libraries to augment their existing support for traditional coarray programming with an implementation that provides a coarray parallel programming model for multi-tiered enterprise storage architectures.

DETAILED DESCRIPTION

Figure 1:
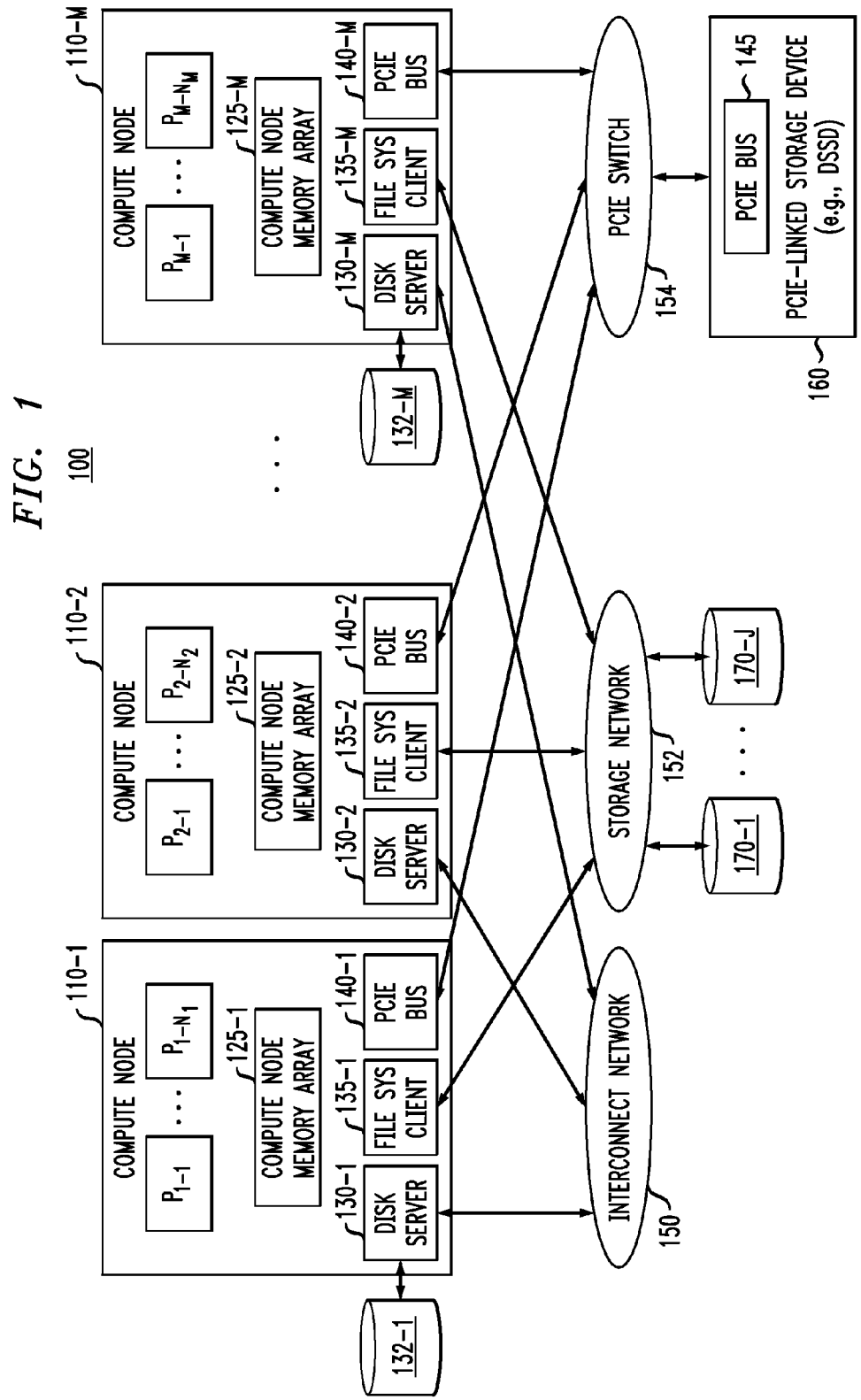
FIG. 1 illustrates an exemplary multi-tiered enterprise storage environment in which aspects of the present invention may be employed.

As will be described, the present invention, in one or more illustrative embodiments, provides techniques for multi-tiered coarray programming. At least one embodiment of the invention extends the coarray parallel programming model of Coarray Fortran to employ one or more indices identifying a particular storage tier where a data element is stored within a multi-tiered enterprise storage environment. Coarray Fortran is typically implemented on top of an MPI library for portability. While exemplary embodiments of the present invention employ MPI communications and the associated MPI application programming interface (API) and library, other message passing paradigms can be employed, as would be apparent to a person of ordinary skill in the art. In addition, while the exemplary embodiment is discussed in the context of particular exemplary storage architectures for each storage tier, such as a flash storage tier comprised of one or more PCIE-linked DSSD™ flash storage devices from EMC Corp., the present invention may be employed in any multi-tiered storage environment, as would be apparent to a person of ordinary skill in the art.

Additional aspects of the invention extend existing MPI libraries to augment their existing support for traditional coarray programming with an implementation that provides a coarray parallel programming model for multi-tiered enterprise storage architectures. Exemplary pseudo code for the extended MPI libraries to implement the multi-tiered storage aspects of the invention is discussed below in conjunction with FIGS. 3 through 9.

FIG. 1 illustrates an exemplary multi-tiered storage environment 100 in which aspects of the present invention may be employed. As shown in FIG. 1, a plurality of interdependent parallel processes $P_{1-1}$ through $P_{M-N_M}$ execute on a plurality of compute nodes 110-1 through 110-M. It is noted that the first index for each process indicates the compute node 110 upon which the process executes and the second index for each process indicates the rank of the process on the respective compute node 110. The number of processes executing on each compute node 110 can vary. Each exemplary compute node 110 comprises a compute node memory array 125-1 through 125-M.

The interdependent parallel processes $P_{1-1}$ through $P_{M-N_M}$ can access various storage tiers and communicate with one another using one or more networks and/or interconnects. In the exemplary embodiment, each exemplary compute node 110 comprises a disk server 130-1 through 130-M, a file system client 135-1 through 135-M, and a PCIE bus 140-1 through 140-M.

The disk servers 130-1 through 130-M are interconnected by an interconnect network 150. The disk servers 130-1 through 130-M allow the processes on a respective compute node 110, such as compute node 110-1, to access its own local storage disk 132-1, or the local storage disk 132-2 through 132-M of another compute node 110-2 through 110-M over the interconnect network 150.

The processes on a respective compute node 110, such as compute node 110-1, can access its own memory array 125-1 using direct memory access. The processes on a respective compute node 110, such as compute node 110-1, can access the memory array 125-2 through 125-M of another compute node 110-2 through 110-M using the coarray Fortran communications described herein.

The file system clients 135-1 through 135-M allow the processes on a respective compute node 110-1 through 110-M to access an exemplary file system stored on one or more disk storage nodes 170-1 through 170-J over a storage network 152. One or more of said disk storage nodes 170 can be embodied using an exemplary Kinetic Open Storage platform from Seagate Technology LLC.

The PCIE buses 140-1 through 140-M allow the processes on a respective compute node 110-1 through 110-M to access one or more PCIE-linked DSSD™ flash storage devices 160 a PCIE bus 140 over a PCIE switch 154, as discussed further below. While exemplary embodiments of the present invention employ Peripheral Component Interconnect Express (PCIE) communications, other low latency communications can be employed, as would be apparent to a person of ordinary skill in the art.

FIG. 2 illustrates a multi-tiered coarray programming model 200 incorporating aspects of the invention. As shown in FIG. 2, a new tier index 210 is added to existing indices that indicate the location of the accessed element across a set of cooperative processes. The existing indices comprise x and y values identifying the row and column of the memory element within the memory array, as well as a node identifier identifying the compute node 110 where the particular memory array resides. The tier index 210 identifies the storage tier where the particular memory array storing the memory element resides (i.e., the tier depth at which the element is accessed), in accordance with aspects of the invention. For example, the exemplary array address [5][6][1][1] indicates x and y addresses of 5 and 6, respectively, a node identifier of 1 and a tier identifier of 1.

With respect to the exemplary embodiment of FIG. 1, for example, tier 0 can be comprised of the memory array 125 on the respective compute node 110, tier 1 can be comprised of the one or more PCIE-linked DSSD™ flash storage devices 160, tier 2 can be comprised of the local file system stored on the remote memory arrays 125 of other compute nodes 110, accessed over the interconnect network 150, and tier 3 can be comprised of the remote file system stored on the one or more disk storage nodes 170-1 through 170-J.

FIGS. 3 through 9 illustrate exemplary pseudo code that extends existing MPI libraries to augment their existing support for traditional coarray programming with an implementation that provides a coarray parallel programming model for multi-tiered enterprise storage architectures. In this manner, aspects of the invention provide communications methods by which an access on a given compute node 110 can store and/or retrieve a requested memory element from the multi-tiered storage environment 100. In particular, the exemplary communications methods extend the coarray programming model to permit use of a file or object interface for remote storage tiers. In addition, the exemplary communications methods extend the coarray programming model to convert from array element notation into object or file identifiers and offsets.

FIG. 3 illustrates exemplary pseudo code 300 that extends existing exemplary coarray Fortran (CAF) compilers to turn array element accesses to storage tiers in a multi-tiered storage environment into storage communications. As noted above, existing CAF compilers read programmer source code and turn array element accesses to remote memory into network communications. An exemplary embodiment of the invention implements the storage communications using an abstract storage layer based on an abstract storage class.

In the exemplary embodiment, the source and destination addresses for the get and put operations comprise 4-tuple values, in a similar manner to the array address discussed above in conjunction with FIG. 2. A put operation converts the exemplary 4-tuple array address to a key indicating a memory address and node. Likewise, a get operation converts a key indicating an address and node to the exemplary 4-tuple array address.

FIG. 4 illustrates exemplary pseudo code 400 that defines an exemplary multi-tiered storage environment comprising five exemplary tiers or classes of storage. In the exemplary implementation of FIG. 4, Class 1 comprises the one or more PCIE-linked DSSD™ flash storage devices 160, Class 2 comprises the local disk system 132 of each compute node 110, Class 3 comprises the global storage system the one or more disk storage nodes 170-1 through 170-J over storage network 152 (e.g., files and/or objects), Class 4 comprises an exemplary Kinetic Open Storage platform from Seagate Technology LLC providing a key-value disk-based storage system. Kinetic (not shown in FIG. 1) and Class 5 comprises a database system, such as a Multidimensional Data Hashing Indexing Middleware (MDHIM) database and/or a ViPR™ software-defined Storage as a Service product from EMC Corp. that provides a key-value interface that will store key-value data and maintain semantic information.

FIG. 5 illustrates exemplary pseudo code 500 that extends existing MPI libraries to provide a coarray parallel programming model for an exemplary DSSD storage tier (Class 1). As shown in FIG. 5, the exemplary pseudo code 500 extends the abstract storage class and provides get and put operations that perform the conversion between the 4-tuple index array values and key values using an addr_to_key function that concatenates the multiple index values in the address into a key. As shown in FIG. 5, a similar class can be provided for an exemplary Kinetic Open Storage platform (Class 4).

FIGS. 6 through 8, collectively, illustrate exemplary pseudo code 600, 700, 800 that extends existing MPI libraries to provide a coarray parallel programming model for an exemplary storage tier comprised of the local disk drives 132 of each compute node (Class 2). As shown in FIG. 6, the exemplary pseudo code 600 extends the abstract storage class and provides get and put operations that perform the conversion between the 4-tuple index array values and files using an addr_to_file function that concatenates the multiple index values in the address into a path name. The exemplary pseudo code 600 sets up communicators that set up the necessary network communications so that each compute node 110 can access each of the disk drives 132 of other compute nodes 110 based on the rank of the respective compute node. As discussed further below in conjunction with FIG. 7, the exemplary pseudo code 600 forks a server thread to listen for requests from other compute nodes.

FIGS. 7 and 8 provide exemplary pseudo code 700 and 800 for helper functions for the servers 130 that control the storage on the local disks 132. The exemplary pseudo code 700 illustrates the thread where the servers 130 run to acknowledge put operations and return the buffer for get operations. The exemplary pseudo code 800 comprises the addr_to_file conversion function that concatenates the index fields (x, y, node-identifier and tier identifier) into a path name, as well as a send_request function that sets up the client/server pairs, packages the request into a message and sends the message using the local client to the remote server at the appropriate index. Since the exemplary local disks 132 provide a file system, the exemplary get and put operations employ a traditional Portable Operating System Interface (POSIX).

FIG. 9 illustrates exemplary pseudo code 900 that extends existing MPI libraries to provide a coarray parallel programming model for a storage tier comprising a global storage system on one or more disk storage nodes 170-1 through 170-J over storage network 152 (e.g., files and/or objects) (Class 3). As shown in FIG. 9, the exemplary pseudo code 900 extends the class local of Class 2 and provides get and put operations that perform the conversion between the 4-tuple index array values and path names values using an addr_to_file function that concatenates the multiple index values in the address into a path name. As noted above, the file system clients 135-1 through 135-M allow the processes on a respective compute node 110-1 through 110-M to access an exemplary file system stored on the disk storage node 170-1 through 170-J over a storage network 152.

Among other benefits, the disclosed multi-tiered coarray programming techniques of the illustrative embodiments allow HPC applications to be deployed in a multi-tiered enterprise storage environment.

The compute nodes 110-1 through 110-M (or portions thereof), comprising a processor, memory and network interface components as described above, are examples of what is more generally referred to herein as a "processing device." Each of the devices herein may similarly be implemented as a processing device comprising processor, memory and network interface components. Thus, one or more of the exemplary compute nodes 110-1 through 110-M in the exemplary enterprise environment comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein may be viewed as examples of what are more generally referred to as "computer program products" storing executable computer program code. Also optionally included in one or more of the exemplary compute nodes 110 is network interface circuitry. The network interface circuitry allows the exemplary compute nodes 110 to communicate over a network with other devices. The network interface circuitry may comprise, for example, one or more conventional transceivers.

CONCLUSION

It is to be appreciated that the particular operations and associated messaging illustrated herein are exemplary only, and numerous other types of operations and messaging may be used in other embodiments.

It should therefore be understood that in other embodiments, different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the exemplary enterprise environment of the present invention. Such components can communicate with other elements of the exemplary enterprise environment over any type of network or other communication media.

As indicated previously, components of an exemplary enterprise environment as disclosed herein can be implemented at least in part in the form of one or more software programs stored in memory and executed by a processor of a processing device. A memory having such program code embodied therein is an example of what is more generally referred to herein as a "computer program product."

The exemplary enterprise environment or portions thereof may be implemented using one or more processing platforms each comprising a plurality of processing devices. Each such processing device may comprise processor, memory and/or network interface components.

As indicated above, the disclosed multi-tiered coarray programming techniques described herein can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of compute nodes and interrelated processes that can benefit from the disclosed multi-tiered coarray programming functionality as described herein. Also, the particular configurations of system and device elements shown in FIG. 1 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A coarray programming method, comprising the steps of:

obtaining an index address identifying a memory element in a memory array in a multi-tiered storage environment, wherein said multi-tiered storage environment comprises at least one of said memory elements on at least two different storage tiers, wherein said memory array is shared by a plurality of processes and a given process of said plurality of processes has an image of variables of said given process, wherein said coarray programming method makes one or more of said variables visible on more than one of said images, and wherein said index address comprises an identifier of a given storage tier within said multi-tiered storage environment where said memory element is stored; and converting said index address to one or more of a path name, an object name and a key value based on said identified given storage tier to access said memory element.

2. The coarray programming method of claim 1, wherein said method extends a coarray programming model to employ one or more of a file interface and an object interface for remote storage tiers.

3. The coarray programming method of claim 1, wherein said converting step further comprises the step of converting an access of an array element to an access of a storage tier in said multi-tiered storage environment using storage communications.

4. The coarray programming method of claim 1, wherein said converting step employs a software function to concatenate a plurality of index values within said index address into said one or more of said path name, said object name and said key value.

5. The coarray programming method of claim 1, wherein said multi-tiered storage environment is accessed by a High Performance Computing (HPC) workload in an enterprise environment.

6. The coarray programming method of claim 1, wherein said multi-tiered storage environment comprises at least two of a flash storage tier, a storage tier comprised of at least one local disk of at least one compute node, a storage tier comprised of a global storage system on at least one disk storage node and a storage tier comprising a database system.

7. The coarray programming method of claim 6, wherein said method employs get and put operations to access said flash storage tier, wherein said get and put operations perform said conversion of said index address to said key value.

8. The coarray programming method of claim 6, wherein said method employs get and put operations to access said storage tier comprised of said global storage system on at least one disk storage node, wherein said get and put operations perform said conversion of said index address to one or more of said path name and said object name.

9. The coarray programming method of claim 6, wherein said method employs get and put operations to access said storage tier comprised of said at least one local disk of said at least one compute node, wherein said get and put operations perform said conversion of said index address to one or more of said path name and said object name.

10. A non-transitory machine-readable recordable storage medium, wherein one or more software programs when executed by one or more processing devices implement the following steps of a coarray programming method:

obtaining an index address identifying a memory element in a memory array in a multi-tiered storage environment, wherein said multi-tiered storage environment comprises at least one of said memory elements on at least two different storage tiers, wherein said memory array is shared by a plurality of processes and a given process of said plurality of processes has an image of variables of said given process, wherein said coarray programming method makes one or more of said variables visible on more than one of said images, and wherein said index address comprises an identifier of a given storage tier within said multi-tiered storage environment where said memory element is stored; and converting said index address to one or more of a path name, an object name and a key value based on said identified given storage tier to access said memory element.

11. A coarray programming system, comprising:

a memory; and at least one processing device configured to:

obtain an index address identifying a memory element in a memory array in a multi-tiered storage environment, wherein said multi-tiered storage environment comprises at least one of said memory elements on at least two different storage tiers, wherein said memory array is shared by a plurality of processes and a given process of said plurality of processes has an image of variables of said given process, wherein said coarray programming method makes one or more of said variables visible on more than one of said images, and wherein said index address comprises an identifier of a given storage tier within said multi-tiered storage environment where said memory element is stored; and convert said index address to one or more of a path name, an object name and a key value based on said identified given storage tier to access said memory element.

12. The coarray programming system of claim 11, wherein said system extends a coarray programming model to employ one or more of a file interface and an object interface for remote storage tiers.

13. The coarray programming system of claim 11, wherein said index address is converted by converting an access of an array element to an access of a storage tier in said multi-tiered storage environment using storage communications.

14. The coarray programming system of claim 11, wherein said index address is converted by employing a software function to concatenate a plurality of index values within said index address into said one or more of said path name, said object name and said key value.

15. The coarray programming system of claim 11, wherein said multi-tiered storage environment is accessed by a High Performance Computing (HPC) workload in an enterprise environment.

16. The coarray programming system of claim 11, wherein one or more compute nodes access said identified storage tier using one or more of a direct memory access, an interconnect network, a storage network and a Peripheral Component Interconnect Express (PCIE) switch.

17. The coarray programming system of claim 11, wherein said multi-tiered storage environment comprises at least two of a flash storage tier, a storage tier comprised of at least one local disk of at least one compute node, a storage tier comprised of a global storage system on at least one disk storage node and a storage tier comprising a database system.

18. The coarray programming system of claim 17, wherein said system employs get and put operations to access said flash storage tier, wherein said get and put operations perform said conversion of said index address to said key value.

19. The coarray programming system of claim 17, wherein said system employs get and put operations to access said storage tier comprised of said global storage system on at least one disk storage node, wherein said get and put operations perform said conversion of said index address to one or more of said path name and said object name.

20. The coarray programming system of claim 17, wherein said system employs get and put operations to access said storage tier comprised of said at least one local disk of said at least one compute node, wherein said get and put operations perform said conversion of said index address to one or more of said path name and said object name.

* * * * *

UNITED STATES PATENT AND TRADEMARK OFFICE
CERTIFICATE OF CORRECTION

PATENT NO.        : 9,501,229 B1                                    Page 1 of 1
APPLICATION NO.   : 14/580544
DATED             : November 22, 2016
INVENTOR(S)       : Bent et al.

It is certified that error appears in the above-identified patent and that said Letters Patent is hereby corrected as shown below:

In Column 3, Line 35, replace "a PCIE bus 140" with --a PCIE bus 145--.

Signed and Sealed this
Second Day of May, 2017

Michelle K. Lee
*Director of the United States Patent and Trademark Office*